Sept. 19, 1961     G. BARSKY ET AL     3,000,759
METHOD OF FORMING PLASTISOL GASKETS ON METAL MEMBERS
Original Filed Oct. 9, 1951
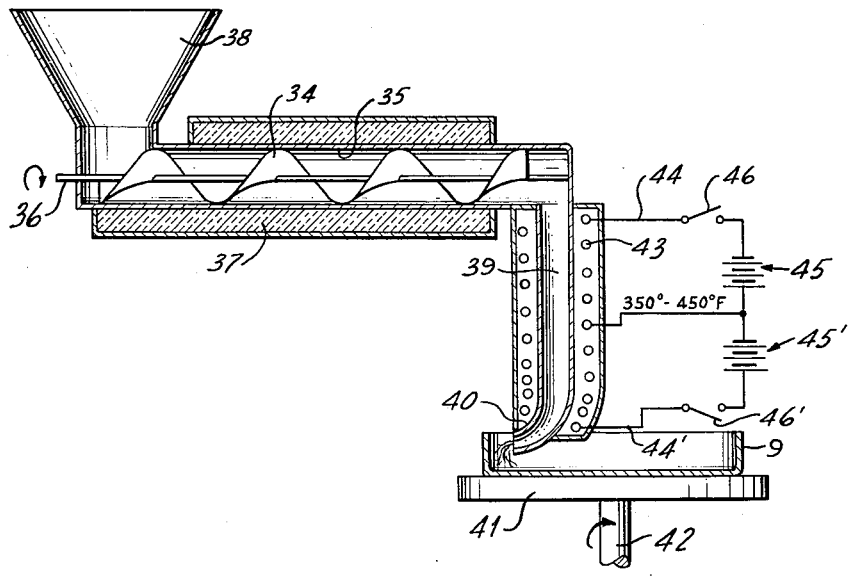
INVENTORS
GEORGE BARSKY
HARRY C. BIERMAN
BY
ATTORNEY United States Patent Office 3,000,759
Patented Sept. 19, 1961

3,000,759
METHOD OF FORMING PLASTISOL GASKETS ON METAL MEMBERS
George Barsky, New York, and Harry C. Bierman, New Rochelle, N.Y.
Original application Oct. 9, 1951, Ser. No. 250,524, now Patent No. 2,888,366, dated May 26, 1959. Divided and this application Oct. 20, 1958, Ser. No. 768,135
4 Claims. (Cl. 117—97)

The present invention is directed to synthetic plastic materials, more particularly to a method and an apparatus for forming gaskets or the like on metal members. This application is a division of application Serial No. 250,524, filed October 9, 1951 now U.S. Patent No. 2,888,366.

It has become common practice to provide gaskets for can covers or the like by first making a mixture of a synthetic plastic material, a plasticizer and a pigment, warming said mixture to cause it to flow freely and then forcing it through a nozzle on to a metal cap or the like to form a gasket. Then the cap so treated was placed in an oven and heated to a relatively high temperature to cause gelation of the composition. This was disadvantageous in that it required a considerable amount of heat at a relatively high cost and a substantial length of time was consumed in the procedure, thus interfering with quantity production. The temperature was so high that it softened the lithographed surface of the cover so that it became scratched and otherwise injured during the operation. Then a special cooling operation was necessary, requiring additional equipment and additional power. It required a cooling operation so that the caps could be handled for packing and shipment.

The present invention is intended and adapted to overcome the difficulties and disadvantages inherent in prior methods, it being among the objects of the present invention to a provide a method of producing and gelling gaskets which is simple and extremely rapid.

It is also among the objects of the present invention to provide a method of producing gaskets on metal articles which includes a heating step but wherein injury to lithographed surfaces is eliminated.

It is further among the objects of the present invention to provide a method which is highly effective, is adapted for use in quantity production and is capable of automatic operation on a large scale.

It is still further among the objects of the present invention to provide an apparatus for carrying out the method which is simple in construction, may be substantially automatic in operation and has relatively few moving parts.

In practicing the present invention there is provided a plastisol which is a heterogeneous mixture of various substances, for example, a polyvinyl chloride resin, dioctyl phthalate and a filler in suitable proportions. This mixture is heterogeneous and it is maintained in the fluid state with some heating if necessary. The mixture is forced on to a metal member such as the inside of a cup or a drum around the inner edges thereof to form a gasket. The material thus laid down is immediately subjected to rapid heating to a temperature at which the mixture becomes gelled while preventing the bulk of the metal from becoming heated to the high temperature.

The heating and the laying down of the gasket material may take place simultaneously. For instance, the plastisol mixture may be fed, under pressure if desired, to a nozzle which is heated to a gelation temperature. The temperature in the nozzle may be graduated from a relatively low temperature at the intake end thereof to a relatively high temperature at the outlet thereof. As the material passes through the nozzle, the constituents begin to blend and at the tip of the nozzle the material practically fully blended is laid down on the metal cap forming the gasket. Gelation takes place almost immediately. In this case only a few seconds are necessary for the laying down and finishing of a gasket.

In the accompanying drawing constituting a part hereof and in which like reference characters indicate like parts, FIG. 1 is a diagrammatic view, some parts being shown in section and illustrating one form of the invention.

There is provided a screw conveyor 34 operating in a closed tube 35 with means attached to shaft 36 for rotating the screw conveyor. Heat and electrical insulation 37 surrounds tube 35 and if desired heating coils may be held therein. Material to be treated is placed in hopper 38 and is fed by screw conveyor 34 under suitable pressure.

At the other end of tube 35 is downwardly extending duct 39 terminating in nozzle 40. A rotating plate 41 has a vertical shaft 42 to which is attached means for rotating plate 41. Surrounding duct 39 and nozzle 40 is a heating coil 43. The upper half of the portion of said heating coil is connected to a source 45 of electricity with switch 46 for controlling the circuit. The lower portion of the heating coil is connected to a source of electricity 45' with a switch 46' for controlling the circuit.

In the operation of the device, a mixture of the constituents including the plastisol, plasticizer, pigment and the like is placed in hopper 38 and the rotation of screw 34 forms a uniform mixture of the constituents while at the same time compressing the same and feeding it forward. A preheat up to about 90° to 120° F. may be imparted to the mixture as it passes through pipe 35. As the mixture passes through duct 39 it is heated still further through the circuit 44—46 and then in the lower part of said duct and in nozzle 40 it is heated by circuits 44'—45' to the maximum temperature, usually 350° to 450° F., which is a temperature of gelation. A can cover or the like 9 on rotating table 41 receives material issuing from nozzle 40 which is deposited in a ring within the corner of the cover. Due to the fact that the mixture is at the gelation temperature, the ring so laid down gells almost immediately without unduly increasing the temperature of the metal of cover 9.

Although the invention has been described setting forth a single specific embodiment thereof, said example is intended to illustrate the invention and not to limit it as various changes in the details may be made within the principles herein set forth. For instance, plate 41 may be cooled so as to keep the temperature of cover 9 down to a relatively low point at all times. The size of the opening of nozzle 40 may be varied or the nozzle may be made removable and nozzles of various sizes substituted therefor.

Various types of mixtures may be used in accordance with the present invention and various forms of covers or similar elements may have gaskets of various sizes and shapes deposited thereon or therein. For example, a cap or other element may have an outer flange and the deposit may be along the outer corner of such an element.

These and other changes in the details of construction may be made without departing from the principles herein set forth, and the invention is to be broadly construed and to be limited only by the character of the claims appended hereto.

We claim:
1. A method of forming plastisol gaskets on metal members which comprises providing a heterogeneous mixture containing a resin and a plasticizer, maintaining the same in fluid state by heating said mixture to a temperature below the gelation point of said mixture, feeding said heated mixture through a heating zone to a point adjacent to said member and at said point raising said mixture to a temperature at which said mixture becomes gelled, simultaneously depositing said mixture onto said member whereby said mixture becomes gelled as it is deposited, while preventing the bulk of said metal from becoming heated to said temperature.

2. A method of forming plastisol gaskets on metal members which comprises providing a heterogeneous mixture containing a resin and a plasticizer, maintaining the same in fluid state by heating said mixture to a temperature below the gelation point of said mixture, feeding said heated mixture through a heating zone to a point adjacent to said member and at said point raising said mixture to a temperature of about 350°–450° F. at which said mixture becomes gelled, simultaneously depositing said mixture onto said member whereby said mixture becomes gelled as it is deposited, while preventing the bulk of said metal from becoming heated to said temperature.

3. A method of forming plastisol gaskets on metal members which comprises providing a heterogeneous mixture containing a resin and a plasticizer, maintaining the same in fluid state by heating said mixture to a temperature below the gelation point of said mixture, feeding said heated mixture through a heating zone to a point adjacent to said member and at said point raising said mixture in a zone adjacent to said metal to a temperature at which said mixture becomes gelled, simultaneously depositing said mixture onto said member whereby said mixture becomes gelled as it is deposited while preventing the bulk of said metal from becoming heated to said temperature, the speed of passage of said mixture through the heating zone being sufficiently rapid to prevent gelation in said zone.

4. A method of forming plastisol gaskets on metal members which comprises providing a heterogeneous mixture containing a resin and a plasticizer, passing said mixture through a heated zone and rapidly heating said mixture during said passage to a temperature at which said mixture becomes jelled, and immediately and simultaneously depositing and gelling said mixture on said metal member.

References Cited in the file of this patent
UNITED STATES PATENTS

| | | |
|---|---|---|
| 2,313,750 | Hothersall | Mar. 16, 1943 |
| 2,553,590 | Joswig | May 22, 1951 |
| 2,654,914 | Maier | Oct. 13, 1953 |